March 1, 1966  E. H. STONICH ETAL  3,238,323
MAGNETIC PRESSURE DIFFERENTIAL CONTROL SWITCH
Filed June 20, 1962  2 Sheets-Sheet 1
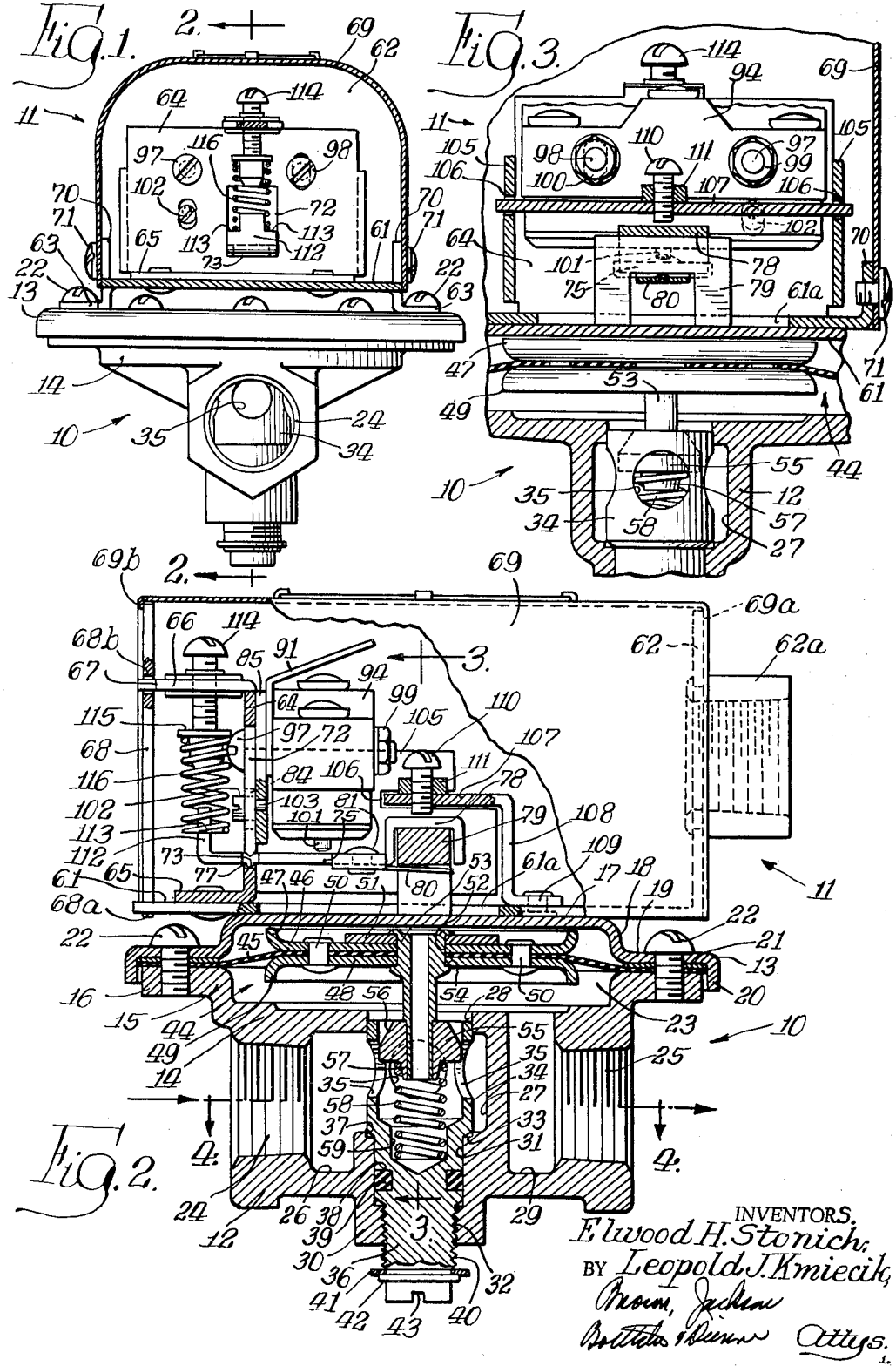
INVENTORS.
Elwood H. Stonich,
BY Leopold J. Kmiecik,

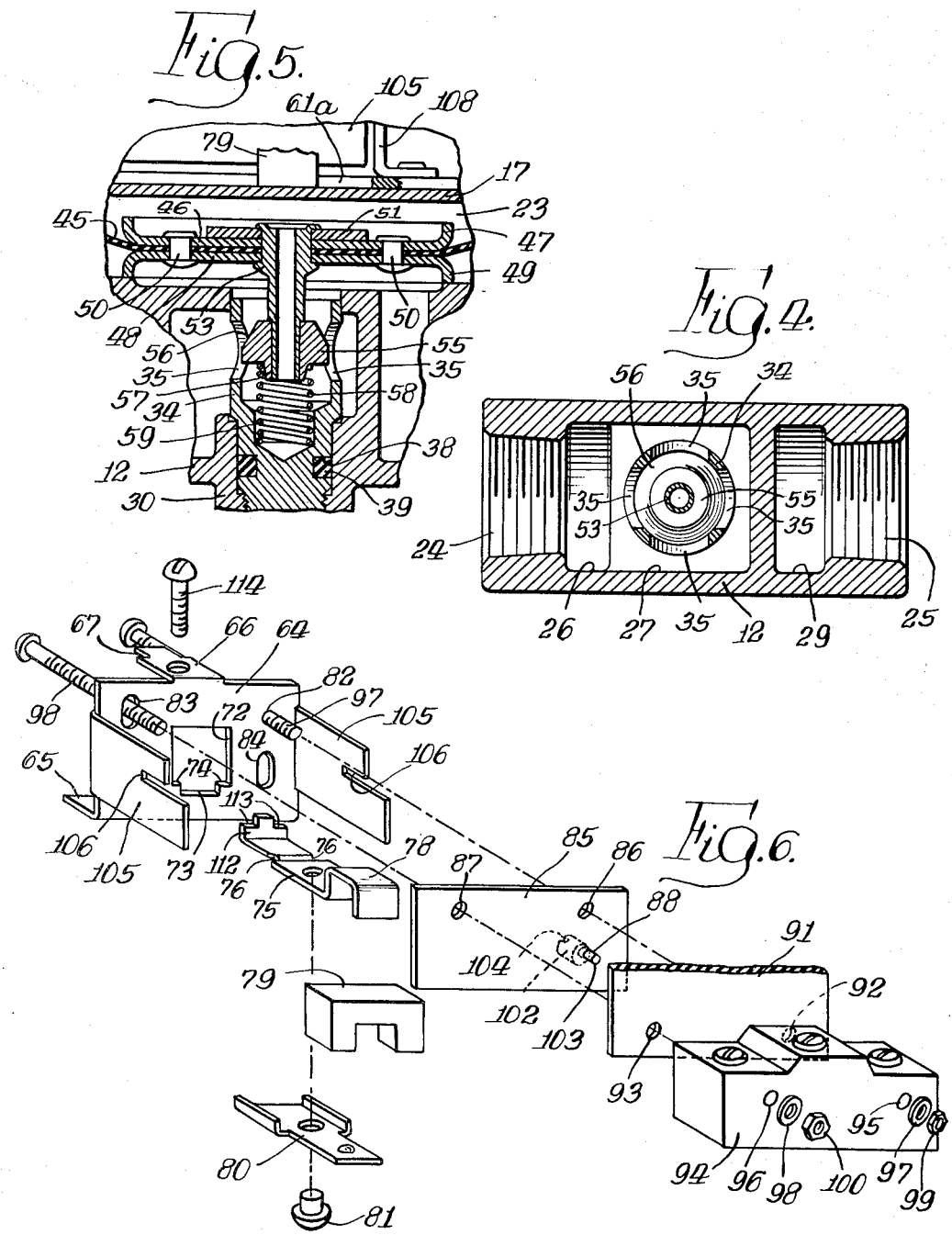

United States Patent Office 3,238,323
Patented Mar. 1, 1966

3,238,323
MAGNETIC PRESSURE DIFFERENTIAL
CONTROL SWITCH
Elwood H. Stonich, Chicago, and Leopold J. Kmiecik, Lincolnwood, Ill., assignors to McDonnell & Miller, Inc., Chicago, Ill., a corporation of Delaware
Filed June 20, 1962, Ser. No. 203,889
3 Claims. (Cl. 200—81.9)

Our present invention relates generally to a control switch and more specifically to a control switch actuated by a fluid pressure differential.

In many types of industrial and commercial control systems, the energization of an electric circuit is related to the flow of fluid through a pipe or conduit. Such control systems usually incorporate switch means adapted to be actuated in response to changes in fluid flow. In these systems, it is desirable, and in most cases essential that actuation of the switch means be effected with a high degree of sensitivity. Prior devices used in control systems of the character described either lack the requisite sensitivity or are of complicated and expensive construction.

It is an object of the present invention to provide a control device of the character indicated in which the switch means is actuated with a positive snap action for sensitive operation.

It is another object of our present invention to provide a control device, as described, in which the switch means is actuated in response to a pressure differential in the fluid line.

It is a further object of our present invention to provide a control device, as described, in which valve means is disposed in the fluid line for restricting the flow of fluid therethrough to thereby establish a pressure differential in the fluid line for actuating the switch means.

Still another object of our present invention is to provide a control device, as described, in which the magnitude of the pressure differential required to operate the device may be selectively regulated.

A further object of our present invention is to provide a control device, as described, in which switch means is mounted exteriorly of the housing of the valve means to prevent fluid to which the device is responsive from communicating with the switch means.

A still further object of our present invention is to provide a control device, as described, which is of simple and economical construction and yet durable in service.

In accomplishing the aforementioned objects, we provide a valve housing having inlet and outlet openings which communicate with the opposite sides of movable diaphragm means. Valve means is interposed between the inlet and outlet openings to restrict the flow of fluid therebetween so as to establish a pressure differential within the valve housing and on opposite sides of the diaphragm means. When a fluid pressure differential exists between the inlet and outlet openings, the diaphragm means is adapted to be moved from a first operative position to a second operative position. Mounted on the valve housing is a switch with a switch actuating element and a pivotally mounted switch actuating lever with magnet means at one end thereof. Magnetic means is associated with the diaphragm means and is adapted when the latter is in its first operative position to attract the magnet means and the one end of the switch actuating lever toward the diaphragm means thereby causing the actuating element of the switch to assume a first operative position. In addition, spring means is associated with the switch actuating lever for biasing the one end of the lever away from the diaphragm means when the latter is in the second operative position, thereby causing the actuating element of the switch to assume a second operative position. Through the arrangement of the switch actuating lever, magnet means and spring means, the switch is actuated with a positive snap action when the diaphragm means is moved from its first operative position to its second operative position in response to a pressure differential in the fluid line.

It is a feature of our present invention that the valve means may be adjusted to vary the restriction of the flow of fluid between the inlet and outlet openings thereby permitting regulation of the pressure differential required to operate the device.

Another feature of the pressure differential actuated control switch of our present invention resides in the provision of valve means that has connection with the diaphragm means and is movable with positive snap action from a position substantially obstructing the flow of fluid between the inlet and outlet openings to a position permitting substantially normal fluid flow therebetween when the diaphragm means is moved from its first operative position to its second operative position.

Now in order to acquaint those skilled in the art with the manner of constructing and utilizing devices in accordance with the principles of our present invention, we shall describe in connection with the accompanyig drawings, preferred embodiment of our invention.

In the drawings:

FIGURE 1 is an end elevational view of one embodiment of a pressure differential actuated control switch constructed in accordance with the principles of our present invention, with portions being broken away and shown in section for the sake of clarity;

FIGURE 2 is an enlarged vertical sectional view, taken substantially along the line 2—2 of FIGURE 1, looking in the direction indicated by the arrows, with the parts being shown in one operative position;

FIGURE 3 is a partial vertical sectional view, taken substantially along the line 3—3 of FIGURE 2, looking in the direction indicated by the arrows;

FIGURE 4 is a horizontal sectional view, taken substantially along the line 4—4 of FIGURE 2, looking in the direction indicated by the arrows;

FIGURE 5 is a partial vertical sectional view corresponding to FIGURE 2, with the parts being shown in a second operative position; and FIGURE 6 is an exploded perspective view of the switch elements of the device of FIGURE 1.

One embodiment of a pressure differential actuated control switch constructed in accordance with the principles of our present invention, as shown in FIGURES 1 through 6, comprises a valve unit, indicated generally by the reference numeral 10, and a switch unit, indicated generally by the reference numeral 11.

As shown in FIGURE 2, the valve unit 10 comprises a lower body member 12 and an upper closure or cover member 13 which together serve as a valve housing. The body member 12 has a generally horizontal circular upper wall portion 14, with an outer peripheral upwardly extending cylindrical wall portion 15, terminating in a radially outwardly extending annular flange portion 16. The cover member 13, which is preferably fabricated from a non-magnetic material such as brass, is formed with a horizontal circular wall portion 17, a generally vertically downwardly extending cylindrical wall portion 18, a radially outwardly extending annular flange portion 19 which is coextensive with the body flange 16, and an annular depending flange portion 20 which is adapted to surround the outer edge of the body flange 16. A suitable annular fluid seal member 21 is arranged intermediate of the body flange 16 and the cover flange 19, and a plurality of circumferentially spaced machine screws 22 are employed to secure these flanges together whereby the cover 13 and body wall 14 serve to define a generally horizontally extending fluid chamber 23.

Below the fluid chamber 23, the body member 12 is formed with horizontally spaced axially aligned threaded inlet and outlet openings 24 and 25, respectively, which are adapted to receive the threaded ends of conventional fluid transmitting pipes or conduits (not shown). As shown in FIGURES 2 and 4, the inlet opening 24 is adapted to be placed in communication with the fluid chamber 23 through fluid passageway means comprising a vertical channel 26, a horizontal channel 27 and a vertical opening 28 in the body wall 14. The outlet opening 25 communicates with the fluid chamber 23 by way of a vertical fluid passage or channel 29 that extends through the body wall 14.

Immediately below the horizontal channel 27, as shown in FIGURE 2, the body member 12 is formed with a boss 30 that has a vertical cylindrical bore 31 therein with threads 32 at the lower end thereof and an annular recess 33 at the upper end thereof. Disposed in the horizontal channel 27 is a vertical cylindrical valve sleeve member 34 which has a plurality of circumferentially spaced ports 35 in the walls thereof. The valve sleeve member 34, at its upper periphery, is seated in the vertical opening 28 in the body wall 14 and, at its lower end, has an integral stem portion 36 of reduced diameter that defines a shoulder 37.

The upper section of the stem portion 36 is received in the bore 31 of the boss 30 and is formed with an annular groove 38 in which is disposed a conventional ring seal 39 for providing a fluid seal between the stem 36 and the bore 31. The lower section of the stem 36 is provided with threads 40 which have threading engagement with the threads 32 in the bore 31. A washer 41 is held in position adjacent the lower terminal ends of the threads 40, outwardly of the body member 12, by means of a snap ring 42. The lower end of the stem 36 has a horizontal slot 43 formed therein which is adapted to receive the blade of a screw driver or other similar tool whereby the valve sleeve 34 may be selectively rotated and thus vertically adjusted within the valve body 12 due to the inter-engagement of the threads 32 and 40. Downward adjustment or travel of the valve sleeve 34 within the body member 12 is limited by engagement of the shoulder 37 with the recess 33 and upward adjustment thereof is limited by engagement of the washer 41 with the lower end of boss 30.

Disposed within the fluid chamber 23, and serving to divide the latter into upper and lower sections, is a vertically movable generally horizontal diaphragm assembly 44 which comprises a central flexible fluid impervious diaphragm element 45 secured, at its outer periphery, between the seal member 21 and body flange 16. Arranged on opposite sides of the diaphragm element 45 are an upper disc 46 with an upstanding annular rim flange 47 and a lower disc 48 with a depending annular rim flange 49. The discs 46 and 48 are secured to the diaphragm element 45 and to each other by means of a plurality of circumferentially spaced rivets 50. Upward movement of the diaphragm assembly 44 within the fluid chamber 23 is limited by engagement of the disc rim flange 47 with the inner surface of the cover member 13, and downward movement thereof is limited by engagement of the disc rim flange 49 with the upper surface of the valve body wall 14. In contact with the upper surface of the disc 46 is a washer member 51 preferably formed of magnetic material.

Extending through a central opening 52 formed in the diaphragm element 45, discs 46 and 48, and magnetic member 51, is the upper end of a vertical tubular member 53. To secure the tubular member 53 within the diaphragm assembly 44, the former is provided with a shoulder 54 that engages the lower surface of the disc 48 and with a thin upper edge that is upset into engagement with the upper surface of the washer member 51. The lower end of the tubular member 53 projects downwardly through the opening 28 in the body wall 14 and into the valve sleeve 34. In assembled relation, the tubular member 53, at its upper end, communicates with the upper section of the fluid chamber 23 and, at its lower end, communicates with the inlet opening 24 through the valve sleeve ports 35, horizontal channel 27 and vertical channel 26. Carried adjacent the lower end of the tubular member 53, and slidably guided within the valve sleeve 34, is a valve member 55 which has a generally cylindrical body portion with an upper annular beveled edge 56 and a lower hub 57 of reduced diameter. A coil spring 58, at its lower end, is seated in a recess 59 formed in the valve sleeve stem 36 and, at its upper end, receives the valve hub 57 and engages the underside of the body of the valve member 55. The spring 58 serves to bias the valve member 55, tubular member 53, diaphragm assembly 44 and magnetic member 51 to the uppermost position shown in FIGURE 2. Since the valve member 55 is carried by the tubular member 53 which is secured in the diaphragm assembly 44, it will be understood that the valve member 55 is vertically movable in response to movement of the diaphragm assembly 44.

When the valve member 55 is in its uppermost position, as shown in FIGURES 2 and 3, it closes off a portion of the valve sleeve ports 35, reduces the effective area of communication between the valve sleeve ports 35 and the upper end of the valve sleeve 34, and thereby serves to restrict the flow of fluid therebetween for a purpose to be more fully described hereinafter. The effective area of communication to be maintained between the ports 35 and the upper end of the valve sleeve 34 when the valve member 55 is in its uppermost position may be selectively controlled through the vertical adjustment of the valve sleeve 34 whereby the upper portions of the valve sleeve ports 35 may be moved away from the valve 55 for increasing the area of communication or returned toward the valve member 55 for decreasing the area of communication. When the valve member 55 is in its lowermost position, as shown in FIGURE 5, normal communication is established between the valve sleeve ports 35 and the upper end of the valve sleeve 34. When normal communication is established, fluid flow between the ports 35 and the upper end of the valve sleeve 34 is not wholly unrestricted but is restricted to a substantially less extent than when the valve 55 is in its uppermost position.

Operatively associated with the afore-described valve unit 10, and mounted directly thereabove, is the switch unit 11 which comprises a generally rectangular horizontal base member 61 with a central rectangular opening 61a therein and with an integral vertical wall 62 at the right end thereof as viewed in FIGURE 2. The wall 62 has an opening therethrough in which is disposed a conduit collar 62a. The base member 61, as shown in FIGURE 1, is formed on opposite sides thereof with a pair of depending foot portions 63 that are secured one each to the valve unit 10 by means of one of the machine screws 22 used to secure the valve cover 13 to the valve body 12. A vertical support member 64, which is arranged adjacent the left end of the switch unit 11, as viewed in FIGURE 2, has a lower rearwardly extending horizontal flange portion 65 which is secured, as by rivets, to the base member 61, and an upper rearwardly extending horizontal flange portion 66 that is notched at the corners of the outer free end thereof to provide shoulders 67. A vertical end plate 68 has projections 68a along its lower edge that fit in vertical slots in the left end of the base member 61 and has a horizontal slot 68b that receives the outer free end of the flange 66 with the shoulder 67 thereof abutting the inner face of the plate 68. The plate 68 is retained in position by means of a cover member 69 which has depending peripheral flanges 69a and 69b at the ends thereof that embrace the end walls 62 and 68 and which, as shown in FIGURE 1, is secured to the upstanding flanges 70 of the base member 61 by means of screws 71.

As shown in FIGURES 1, 2 and 6, the support member 64 has a central opening 72 formed therein with the lower edge thereof being notched to define an abutment 73 and spaced shoulders 74. Extending through the opening 72 is a switch actuating lever 75 which has opposed side recesses 76 formed therein intermediate of the ends thereof and which is crimped on a line extending between the recesses 76 to thereby define a transverse balance edge 77 along the lower surface thereof. The shoulders 74 of the support member 64 are received with slight clearance in the recesses 76 of the lever 75 and the balance edge 77 of the latter rests on the abutment 73. The cooperating balance edge 77 and abutment 73 provide a sensitive pivot for the lever 75 while the cooperating shoulders 74 and recesses 76 serve to guide the lever 75 during pivotal movement thereof. The lever 75 is formed with a generally inverted U-shaped forward end 78 which carries a transverse U-shaped magnet 79 retained in position by a spring clip 80. The spring clip 80 at its one end is suitably secured, as by a rivet 81, to the lever 75 and at its other end engages the underside of the bight portion of the magnet 79.

As shown in FIGURE 6, switch mounting apertures 82, 83, and 84 are formed in the support member 64 with the apertures 83 and 84 being both slightly wider than the aperture 82 and elongated in a vertical direction. Abutting the forward surface of the support member 64 is a vertical switch mounting plate 85 having apertures 86, 87 and 88 therein aligned with the apertures 82, 83 and 84 in the support member 64; abutting the forward surface of the mounting plate 85 is a vertical insulation member 91 having apertures 92 and 93 therein aligned with the apertures 86 and 87 in the mounting plate 85; and abutting the forward surface of the insulation member 91 is a conventional electrical switch 94 having apertures 95 and 96 therein aligned with the apertures 92 and 93 in the insulation member 91. The mounting plate 85, insulation member 91, and switch 94 are retained in assembled position by screws 97 and 98 which extend, respectively, through the apertures 82, 86, 92, and 95, and the apertures 83, 87, 93, and 96, and which, respectively, have washers 97 and 98 and nuts 99 and 100 fastened on their ends.

As shown in FIGURE 2, the switch 94 has a downwardly extending plunger or actuator element 101 that engages the lever 75 at a point intermediate of the support member 64 and the magnet 79. The switch plunger 101 is normally biased downwardly to one operative position and is adapted to be moved upwardly to a second operative position in response to upward pivotal movement of the forward end of the lever 75. Adjustment of the plunger 101 relative to the lever 75 is adapted to be effected by means of a cylindrical off-center adjustment member 102 that extends through the aperture 84 in the supporting member 64. The adjustment member 102 has a forward eccentric projection 103 that is received in the aperture 88 in the mounting plate 85, and has a slot 104 formed in the rear end thereof which is adapted to receive the blade of a screw driver or other similar tool. When the screws 97 and 98 are slightly loosened, the member 102 and projection 103 may be selectively rotated for causing limited pivotal movement of the mounting plate 85, insulation member 91, and switch 94 relative to the support member 64 and lever 75 about the axis of the screws 97.

As shown in FIGURES 3 and 6, extending forwardly from the sides of the support member 64 are a pair of vertical arm members 105 having horizontal slots 106 in the forward ends thereof. Disposed in the slots 106 is a rearwardly extending upper horizontal flange portion 107 of a transverse Z-shaped angle member 108 which has a forwardly extending lower horizontal flange portion 109 suitably secured, as by rivets, to the base member 61. The flange 107, which overlies the forward end 107 of the switch lever 75, has an adjustable screw 110 threaded therethrough which serves as a stop to limit upward pivotal movement of the forward end of the switch lever 75. The screw 110 is provided with a nut 111 for locking the screw 110 in a predetermined selected position. The rear end of the switch lever 75 is formed with an upstanding flange portion 112 having the upper corners thereof notched to define shoulders 113. The flange 66 of the support member 64, which overlies the flange 112 of the switch lever 75, has an adjustable screw 114 threaded therethrough which carries a washer 115. Interposed between the switch flange shoulders 113 and the washer 115 is a coil spring 116 which serves to bias the rear end of the switch lever 75 downwardly. Through adjustment of the screw 114, the compression of the spring 116, together with the force exerted by the latter on the rear end of the switch lever 75, may be regulated.

Having completed a description of the various elements of one embodiment of a pressure differential actuated control switch constructed in accordance with the principles of our present invention, we shall now describe the manner in which this device operates. When there is no fluid flow through the valve unit 10, the components of the control device assume the positions shown in FIGURE 2. The spring 58 locates the valve member 55, tubular member 53, diaphragm assembly 44 and magnetic member 51 in their uppermost positions with the disc rim flange 47 engaging the inner surface of the cover member 13. At the same time, the magnetic washer member 51 due to attraction between the magnet 79 and the member 51 locates the magnet 79 in its lowermost position where it projects through the opening 61a in the switch base 61 and engages the outer surface of the cover member 13. In this position, the magnet 79 holds the forward end of the lever 75 in a downward position thereby permitting the switch plunger 101 of the switch 94 to assume a first operative position.

Upon the initiation of the flow of fluid through the valve unit 10, fluid is transmitted from the inlet opening 24 to the upper half of the fluid chamber 23 through the vertical channel 26, horizontal channel 27, valve sleeve ports 35, and the tubular member 53. At the same time, fluid is transmitted between the inlet and outlet openings 24 and 25 through the vertical channel 26, horizontal channel 27, valve sleeve ports 35, the upper end of valve sleeve 34, the lower half of the fluid chamber 23, and the vertical channel 29. During initial fluid flow, the valve member 55, as previously noted in connection with FIGURES 2 and 3, serves to reduce the effective area of communication between the valve sleeve ports 35 and the upper end of the valve sleeve 34 thereby restricting the flow of fluid therebetween so as to establish a pressure differential within the valve unit 10 and on opposite sides of the diaphragm assembly 44. When the pressure differential reaches a predetermined level to overcome the force of the spring 58, the diaphragm assembly 44 is moved with positive snap action from its uppermost position shown in FIGURE 2 to its lowermost position shown in FIGURE 5 with the disc rim flange 49 engaging the inner surface of the valve housing wall 14. As the diaphragm assembly 44 moves downwardly, the tubular member 53 and valve member 55 are likewise moved downwardly to the positions shown in FIGURE 5. In this position of the valve 55, normal communication is established between the valve sleeve ports 35 and the upper end of the valve sleeve 34 and normal fluid flow occurs between the inlet and outlet openings 24 and 25. However, the valve 55 continues to partially restrict fluid flow therepast in order to preserve a slight pressure differential within the valve unit 10 and on opposite sides of the diaphragm assembly 44 so as to maintain the latter in its lowermost position. As previously described, the effective area of communication between the ports 35 and the upper end of the valve sleeve 34 may be varied by adjusting the vertical position of the valve sleeve 34, thereby permitting the pressure differential required to operate the device to be selectively regulated.

Also, as the diaphragm assembly 44 is moved from its upper operative position to its lower operative position, the magnetic member 51 is moved away from the magnet 79. The magnetic force between these members is thereby materially reduced and is overcome by the switch actuating lever spring 116 which serves to pivot the lever 75, in a counter-clockwise direction as viewed in FIGURE 2, on its balance edge 77, until the forward end 78 engages the stop screw 110. During this pivotal movement of the lever 75, the latter engages and depresses the switch plunger 101 thereby causing it to assume a second operative position while normal fluid flow occurs between the inlet and outlet openings 24 and 25. As will be understood by those skilled in the art, the switch 94 may be incorporated in a normally open or in a normally closed electrical circuit. In the former case, depression of the plunger 101 serves to close the circuit; in the latter case, depression of the plunger 101 serves to open the circuit. In either case, the switch 94 is actuated with a positive snap action in response to a pressure differential in the valve unit 10.

Upon the cessation of the flow of fluid through the valve unit 10, the pressure within the valve unit 10 and on opposite sides of the diaphragm assembly 44 becomes equalized at which time the valve spring 58 returns the valve 55, tubular member 53, diaphragm assembly 44 and magnetic member 51 from their lowermost positions shown in FIGURE 5 to their uppermost positions shown in FIGURE 2. As the magnetic member 51 is again moved toward the magnet 79, the magnetic force between these members is materially increased to the point that it overcomes the force of the switch actuating lever spring 116 whereupon the magnet 79 is attracted downwardly causing the lever 75 to pivot clockwise, as viewed in FIGURE 2, on its balance edge 77, until the magnet 79 engages the outer surface of the cover member 13. Due to this pivotal movement of the lever 75, the latter permits the switch plunger 101 to return to its first operative position.

While we have shown and described what we consider to be a preferred embodiment of our present invention, it will be understood that various modifications and rearrangements may be made therein without departing from the spirit and scope of our invention.

We claim:

1. In combination, a valve housing having spaced inlet and outlet openings, a fluid chamber in said valve housing overlying said inlet and outlet openings, diaphragm means dividing said chamber into first and second sections and being movable between a first and a second operative position, first fluid passageway means at its one end communicating with said inlet opening and at its other end having an opening communicating with said second section of said chamber, second fluid passageway means at its one end communicating with said second section of said chamber and at its other end communicating with said outlet opening, a valve sleeve disposed in said first fluid passageway means with one end thereof seating in said opening of said first fluid passageway means, said valve sleeve having at least one port in the walls thereof, a tubular member at its one end secured in said diaphragm means and communicating with said first section of said chamber and at its other end projecting into said valve sleeve and communicating with said first fluid passageway means through said port in said valve sleeve, a valve member vertically slidable in said valve sleeve and carried adjacent the said other end of said tubular member, said valve member serving to restrict fluid flow between said port in said valve sleeve and the said one end of the latter when said diaphragm means is in its first operative position to thereby establish a fluid pressure differential between said inlet and outlet openings upon initiation of fluid flow, said valve member serving to permit normal fluid flow between said port in said valve sleeve and the said one end of the latter when said diaphragm means is in its second operative position, and said diaphragm means being adapted to be moved from said first operative position to said second operative position when a fluid pressure differential exists between said inlet and outlet openings.

2. In combination, a valve housing having spaced inlet and outlet openings, a fluid chamber in said valve housing overlying said inlet and outlet openings, diaphragm means dividing said chamber into upper and lower sections and being vertically movable between an upper and a lower position, first fluid passageway means at its one end communicating with said inlet opening and at its other end having a vertical opening communicating with said lower section of said chamber, second fluid passageway means at its one end communicating with said lower section of said chamber and at its other end communicating with said outlet opening, a vertical valve sleeve disposed in said first fluid passageway means with the upper periphery thereof seating in said opening of said first fluid passageway means, said valve sleeve having at least one port in the walls thereof, a vertical tubular member at its upper end secured in said diaphragm means and communicating with said upper section of said chamber and at its lower end projecting into said valve sleeve and communicating with said first fluid passageway means through said port in said valve sleeve, means normally biasing said tubular member upwardly thereby disposing said diaphragm means in said upper position, a valve member vertically slidable in said valve sleeve and carried adjacent the lower end of said tubular member, said valve member serving to restrict fluid flow between said port in said valve sleeve and the upper end of the latter when said diaphragm means is in its upper position to thereby establish a fluid pressure differential between said inlet and outlet openings upon initiation of fluid flow, said valve sleeve being vertically adjustable relative to said valve member to control the pressure differential between said inlet and outlet openings, said valve member serving to permit normal fluid flow between said port in said valve sleeve and the upper end of the latter when said diaphragm means is in its lower position, and said diaphragm means being adapted to be moved from said upper position to said lower position when a fluid pressure differential exists between said inlet and outlet openings.

3. In combination, a valve housing having horizontally spaced axially aligned inlet and outlet openings, a horizontally extending fluid chamber in said valve housing overlying said inlet and outlet openings, generally horizontal diaphragm means dividing said chamber into upper and lower sections and being vertically movable between an upper and a lower position, first fluid passageway means at its one end communicating with said inlet opening and at its other end having a vertical opening communicating with said lower section of said chamber centrally thereof, second fluid passageway means at its one end communicating with said lower section of said chamber and at its other end communicating with said outlet opening, a vertical valve sleeve disposed in said first fluid passageway means with the upper periphery thereof seating in said opening of said first fluid passageway means, said valve sleeve having a plurality of circumferentially spaced ports in the walls thereof, a vertical tubular member at its upper end secured in said diaphragm means and communicating with said upper section of said chamber and at its lower end projecting into said valve sleeve and communicating with said first fluid passageway means through said ports in said valve sleeve, spring means normally biasing said tubular member upwardly thereby disposing said diaphragm means in said upper position, a valve member vertically slidable in said valve sleeve and carried adjacent the lower end of said tubular member, said valve member serving to restrict fluid flow between said ports in said valve sleeve and the upper end of the latter when said diaphragm means is in its upper position to thereby establish a fluid pressure differential between said inlet and outlet openings upon initiation of fluid flow, said valve sleeve being vertically adjustable relative to said valve member to control the pressure differential between said inlet and outlet openings, said valve member serving to permit normal fluid flow between said ports in said valve sleeve and the upper end of the latter when said diaphragm means is in its lower position, and said diaphragm means being adapted to be moved from said upper position to said lower position when a fluid pressure differential exists between said inlet and outlet openings.

References Cited by the Examiner

UNITED STATES PATENTS

| | | | |
|---|---|---|---|
| 2,220,496 | 11/1940 | Ringelstetter | 137—503 |
| 2,374,568 | 4/1945 | Terry | 137—503 |
| 2,623,331 | 12/1952 | Greenig | 137—501 |
| 2,628,296 | 2/1953 | Dillman | 200—83 |
| 2,647,402 | 8/1953 | Ibbott | 137—503 |
| 2,727,108 | 12/1955 | Chisholm | 200—67 |
| 2,915,084 | 12/1959 | Perkins | 137—501 |
| 2,951,129 | 8/1960 | Mink | 200—67 |
| 3,084,864 | 4/1963 | Snoberger | 200—140 X |

BERNARD A. GILHEANY, *Primary Examiner.*